United States Patent [19]

Song et al.

[11] Patent Number: 4,829,381
[45] Date of Patent: May 9, 1989

[54] SYSTEM AND METHOD FOR ELECTRONIC IMAGE ENHANCEMENT BY DYNAMIC PIXEL TRANSFORMATION

[75] Inventors: Woo-Jin Song, Waltham; Donald S. Levinstone, Lexington, both of Mass.

[73] Assignee: Polaroid Corporation, Cambridge, Mass.

[21] Appl. No.: 182,987

[22] Filed: Apr. 18, 1988

[51] Int. Cl.$^4$ .................... H04N 5/235; H04N 5/208
[52] U.S. Cl. .................................. 358/168; 358/166; 358/32; 358/164
[58] Field of Search ................. 358/166, 167, 36, 37, 358/168, 169, 32, 164

[56] References Cited

U.S. PATENT DOCUMENTS

| | | | |
|---|---|---|---|
| 4,215,294 | 7/1980 | Taggart | 358/168 X |
| 4,334,244 | 6/1982 | Chan et al. | 358/166 |
| 4,489,349 | 12/1984 | Okada | 358/168 |
| 4,523,230 | 6/1985 | Carlson et al. | 358/167 |
| 4,549,212 | 10/1985 | Bayer | 358/167 |
| 4,568,978 | 2/1986 | Cosh | 358/32 X |
| 4,663,667 | 5/1987 | Shenk | 358/169 |
| 4,751,566 | 6/1988 | Pilot | 358/32 |

FOREIGN PATENT DOCUMENTS

| | | | |
|---|---|---|---|
| 2312150 | 12/1976 | France | 358/164 |
| 1605009 | 12/1981 | United Kingdom | 358/168 |

*Primary Examiner*—James J. Groody
*Assistant Examiner*—E. Anne Faris
*Attorney, Agent, or Firm*—Edward S. Roman

[57] ABSTRACT

A system and method are provided for continuously enhancing electronic image data received in a continuous stream of electronic information signals wherein the electronic information signal corresponding to each pixel of the image recorded is selectively transformed as a function of the average value of electronic information signals for a select plurality of pixel values in the immediate area of the pixel value being transformed. The electronic information signal transformations are provided on a pixel-by-pixel basis to increase contrast in localized areas that may be either exceptionally light or dark as a result of varying scene lighting conditions.

13 Claims, 2 Drawing Sheets

SYSTEM AND METHOD FOR ELECTRONIC IMAGE ENHANCEMENT BY DYNAMIC PIXEL TRANSFORMATION

BACKGROUND OF THE INVENTION

1. Field of the Invention

This invention relates generally to a system and method for electronic image enhancement by dynamic pixel transformation and, more particularly, to a system and method for enhancing electronic image information by dynamically transforming electronic information signals on a pixel-to-pixel basis.

2. Description of the Prior Art

Electronic still image cameras are becoming well known in the art. Such cameras utilize photoresponsive arrays to sense scene light and convert the sensed scene light into electronic information signals. Electronic information signals are thereafter stored on a suitable media which may include magnetic, optical or solid state storage for subsequent retrieval and viewing. It may be desirable at some point to transform the stored image defining electronic information signals to a hard copy of the scene originally recorded. Photographic media have been suggested and used for such purposes. Difficulties arise, however, as a result of differences between the wide dynamic range of the scene originally sensed and recorded and the substantially smaller dynamic range to which a photographic print may be exposed. The wide dynamic range of luminance intensities within the scene originally recorded may thus be compressed or clipped to the substantially smaller dynamic range of the photographic print, losing detail within certain portions of the dynamic range that were otherwise visible in the original scene. Thus, it may be desirable to transform the original image defining electronic information signals in a nonlinear manner to selectively increase and/or decrease the contrast and brightness in certain portions of the scene such as those that might be brightly lit by sunlight or underlit as a result of shadows. However, no single transform function can be uniformly applied to all the image defining electronic information signals of the scene and achieve satisfying results because the lighting conditions vary across the scene.

Therefore, it is an object of this invention to provide a system and method of electronically enhancing images by dynamically increasing or decreasing contrast and brightness in selected portions of the scene that may be overlit or underlit.

It is a further object of this invention to provide a system and method of enhancing image defining electronic information signals in a dynamic manner on a pixel-by-pixel basis such that the value of each pixel is selectively transformed as a function of the average value of a plurality of pixels closely spaced about that pixel.

Other objects of the invention will be in part obvious and will in part appear hereinafter. The invention accordingly comprises a mechanism and system possessing the construction, combination of elements and arrangement of parts which are exemplified in the following detailed disclosure.

SUMMARY OF THE INVENTION

A system is provided for enhancing electronic image data received in a continuous stream of electronic information signals wherein each signal corresponds to one of a plurality of succeeding pixels. The pixels collectively define the image to be recorded. Means are provided for averaging the electronic information signals corresponding to selected pluralities of pixels and providing an average electronic information signal for each of the plurality of the pixels so averaged. Means operate to thereafter select one of the plurality of different transfer functions of electronic information signals for each of the succeeding pixels. Each transfer function is selected as a function of the electronic information signal for one pixel and the average electronic information signal for the select plurality of pixels containing that one pixel. The electronic information signal corresponding to each pixel is subsequently transformed by the transfer function selected for that pixel. The system responds to an average electronic information signal indicative of low scene light intensity levels by transforming electronic information signals to provide a higher contrast and/or brightness to those electronic information signals corresponding to pixels having the lowest scene light intensity levels. The system also responds to an average electronic information signal indicative of high scene light intensity levels by transforming electronic information signals to provide a higher contrast and/or lower brightness to those electronic information signals corresponding to pixels having the highest scene light intensity levels.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

DESCRIPTION OF THE PREFERRED EMBODIMENT

In electronic image processing it is desirable to adjust the image contrast automatically to produce more detail in both the bright and dark areas of a scene that is recorded. The image enhancing system and method of this invention operates to both lighten the dark regions of a scene and darken the light regions of a scene by enhancing contrast to improve the detail visibility that would otherwise be lost when the electronic image signals are converted to a hard copy reproduction. Toward that end, the system and method of this invention operates to continuously enhance electronic image data received in a continuous stream of electronic information signals, each signal of which corresponds to one of the plurality of succeeding pixels which collectively define the recorded image.

Figure 1:
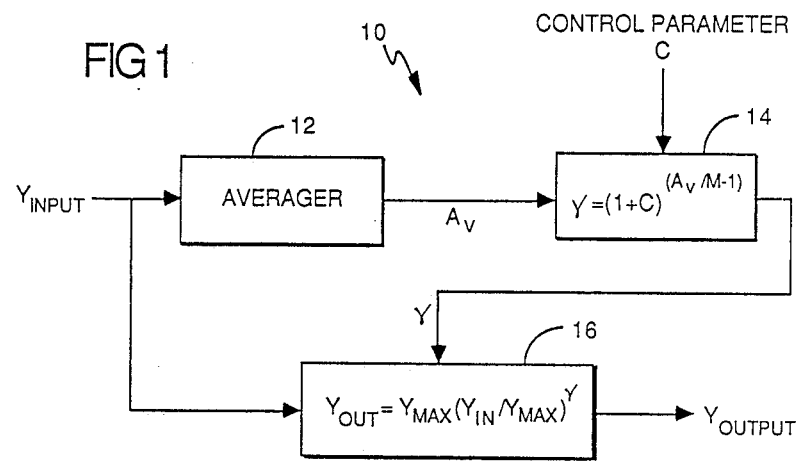
FIG. 1 is a block diagram showing the system for enhancing electronic image data in the manner of this invention.

Referring now to FIG. 1, there is shown a block diagram for the system of this invention in which a continuous stream of electronic information signals each corresponding to one of a plurality of succeeding pixels from the recorded image are received at terminal $Y_{input}$. The electronic information signals input at terminal $Y_{input}$ may be derived in a well-known manner by a two-dimensional photosensitive array or sensor (not shown) which may comprise a high resolution charge coupled device (CCD) or charge injection device (CID). The sensor receives image scene light in any well-known manner by way of an objective lens and shutter (also not shown). The image sensing array comprises a plurality of image sensing elements or pixels preferably arranged in a two-dimensional area array wherein each image sensing pixel converts the incident image defining scene light rays into a corresponding analog electronic information signal value. Preferably, the image sensing pixels are arranged in columns and rows as is well known in the art. As will be readily understood, image sensing arrays, particularly for sensing still images, preferably comprise a large number of image sensing elements or pixels in the order of 500,000 or greater.

The two-dimensional photosensitive arrays may also be overlayed with any one of a variety of different well-known filter patterns so that each pixel provides an electronic information signal value corresponding to a particular color. For instance, the columns of the two-dimensional photosensitive array may be overlayed with any one of a red, green or blue filter stripe arranged in a repeating fashion across the face thereof. The electronic information signal value for each pixel in this arrangement thus corresponds to a particular color.

The electronic information signal values retrieved from the photosensitive array in this manner are preferably converted to luminance (Y) and chrominance, e.g., (R-Y and B-Y) signal values. For the case where the two-dimensional photosensitive array is overlayed with red, green and blue filters, the luminance electronic information signals are preferably determined by the following relationship: $Y=0.30R+0.59G+0.11B$ as is well known in the television art. The analog luminance electronic information signal values for each pixel element of the photosensitive array for the example herein described are digitized to an 8-bit binary number so as to have a dynamic integer range of from 0 - 255 within which range are 256 intensity levels and a maximum luminance value of $Y_{MAX}=255$. The electronic image detection and processing herein described so far will be recognized as being conventional and well known in the art.

The image defining electronic information signals derived in the above-described manner and preferably comprising digitized luminance signals are thereafter subjected to a gain control function which may be automatic as is well known in the art before being directed to input terminal $Y_{input}$ of the block diagram of FIG. 1. The image defining luminance electronic information signals are thereafter averaged for selected pluralities of pixels by an averager 12. The averager 12 may comprise a low pass filter as is well known in the art which operates to provide an average value electronic information signal Av corresponding to the average luminance values for a selected window or plurality of pixels that continuously changes in correspondence with each succeeding pixel value to be enhanced. Alternatively, the averager may comprise a block average in which a selected group or block of pixel values is averaged to provide one average value electronic information signal Av in correspondence with each pixel value of that group to be enhanced. Succeeding groups of pixel values are thereafter averaged. In the preferred mode, the selected groups of pixels are preferably selected in two dimensions from the photosensitive array.

Both low pass filtering and block averaging require a buffer memory to hold the selected groupings of pixel values for averaging as is well known in the art. The low pass filter method results in a continuing change in the average value of the electronic information signal Av for each succeeding pixel thereby providing a more accurate determination of average values for selecting the appropriate transfer function in the manner of this invention to be described. However, as will be well understood, the low pass filtering technique requires a substantially increased computational capacity in comparison to block averaging; and, therefore, block averaging, although not as highly selective as low pass filtering, may be preferred in image enhancing applications where reduced computational capacity is desired. Low pass filtering and block averaging are both well-known techniques in the electronic arts and therefore need not be described in any further detail herein.

The average value for the image defining luminance electronic information signal (Av) is thereafter provided to a gamma determining circuit 14 which determines gamma as a function of the average value input thereto in accordance with the following relationship:

$$\gamma=(1+C)(Av/M-1)$$

In the above relationship M for this example is selected to be the center value of the dynamic range of the electronic information signals. As was previously stated, the electronic signal values for this example comprise 8-bit binary numbers having a dynamic range of 256. Thus, for this example, $M=128$. However, it will be readily understood that M may be selected to be any value within the dynamic range of the electronic information signals depending upon where the least image enhancement is desired. Thus, for the case where M is selected to be at the center of the dynamic range, image enhancement will have the greatest effect near the ends of the dynamic range and the least effect toward the center of the dynamic range. Selecting the value of M to be closer to the high end of the dynamic range will decrease the effective image enhancement provided at that end by the system and method of this invention.

C is a control parameter selected in the manner of this invention to vary the amount of image enhancement that may be provided by the system and method of this invention in a manner to be more fully described in the following discussion.

The value of gamma is thereafter directed to a transfer function imposing circuit 16 which operates to impose the following transfer function on the image defining luminance electronic information signals (Y) received at input terminal $Y_{input}$ and corresponding to each one of the succeeding pixels which collectively define the recorded image.

$$Y_{out}=Y_{MAX}(Y_{in}/Y_{MAX})^{\gamma}$$

$Y_{MAX}$ equals the highest value of the dynamic range for the electronic information signals or 255 for the example herein described. $Y_{out}$ equals the image defining luminance electronic information signal transformed in the manner of this invention to provide an enhanced image. As is now readily apparent, it is selected for the image defining luminance electronic information signal for each pixel as a function of a local average of image defining luminance electronic information signals for a select group or plurality of pixels closely spaced about the pixel value being enhanced or transformed. Thus, gamma γ changes continuously in correspondence with the average values from the continuous stream of succeeding image defining luminance electronic information signals so that each image defining luminance electronic information signal is enhanced or transformed by a selected one of a plurality of different transfer functions.

Figure 2:
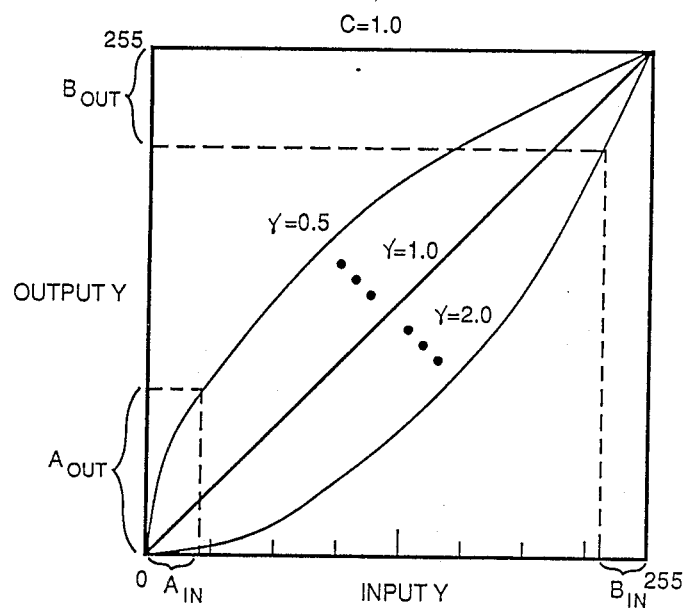
FIG. 2 is a graphical representation showing the output electronic information signals versus the input electronic information signals.

Referring now to FIG. 2, there is shown a graphical representation of the various transfer functions that are imposed by the transfer function circuit 16 as a function of the variation in gamma γ. For the example as shown in FIG. 2, the control parameter C is selected to equal 1 and thus it can be seen that gamma γ has a variation of from 0.5 to 2. For instance, in the situation where the average value of the image defining luminance electronic signals is high and approaches the maximum value of the dynamic range which in this example equals 255 and is indicative of a portion of the image that is extremely bright, it can be seen that gamma γ equals 1+C or as in the case where C=1, gamma γ=2 as shown in the diagram of FIG. 2. The slope of the transfer function as is readily apparent for the situation where gamma γ=2 becomes quite steep at the high end of the dynamic range ($B_{in}$, $B_{out}$) thereby providing a higher contrast to those image defining luminance electronic information signals corresponding to pixels having the highest scene light intensity levels. The slope of the transfer function for γ=2 decreases significantly at the low end of the dynamic range ($A_{in}$, $A_{out}$) thereby providing a lower contrast to those image defining luminance electronic information signals corresponding to pixels having the lowest scene light intensity levels. Since M is selected to be at the center of the dynamic range, it can be seen that the slope of the transfer function at the center of the dynamic range most closely approximates that of a straight line thereby providing the least effect on the output signal for pixels having intensity levels near the center of the dynamic range.

Conversely, in the situation where the average values of the image defining luminance electronic information signals are low approaching 0 indicative of localized areas of low scene light intensity levels, then gamma γ=1 divided by 1+C which equals 0.5 in the case where C=1. The transfer function imposed by the transfer function circuit 16 in the case where gamma γ equals 0.5 is shown graphically in FIG. 2 as comprising a substantially steep slope in the areas ($A_{in}$, $A_{out}$) where the image defining luminance electronic information signal values are low. Thus, the transfer function in this case where gamma γ equals 0.5 operates to transform the image defining luminance electronic information signals to provide a high contrast to those electronic information signals corresponding to pixels having the lowest scene light intensity levels. The slope of the transfer function for γ=0.5 decreases significantly at the high end of the dynamic range ($B_{in}$, $B_{out}$) thereby providing a lower contrast to those image defining luminance electronic information signals corresponding to pixels having the highest scene light intensity levels. Again, since M is selected to be at the center of the dynamic range, it can be seen that the slope of the transfer function at the center of the dynamic range most closely approximates that of a straight line thereby providing the least effect on the output signal for pixels having intensity levels near the center of the dynamic range. It can be seen that the transfer function imposed by the transfer function circuit 16 can have any intermediate number of transfer functions shown between the extreme end transfer functions where gamma equals 0.5 or 2.0 and that all of the transfer functions are operative for the full extent of the input dynamic range so as not to clip the input signal values.

In the situation where the average value for the image defining luminance electronic information signal values corresponds to the intermediate value of the dynamic range, gamma γ=1 and the transfer function becomes a straight line to provide a one-to-one relationship between the input and output electronic information signals with no localized increase in contrast as provided by the other transfer functions where gamma γ is either greater or less than 1. Thus, in this manner in a situation where a scene may have localized dark or bright areas, there may be provided a localized increase in the contrast to those areas to make visible details that otherwise would be lost. The transfer functions vary in correspondence with the variation in the local average scene light intensity levels so as to apply the increased contrast selectively to those light or dark portions of the scene where details are otherwise obscured.

Figure 3:
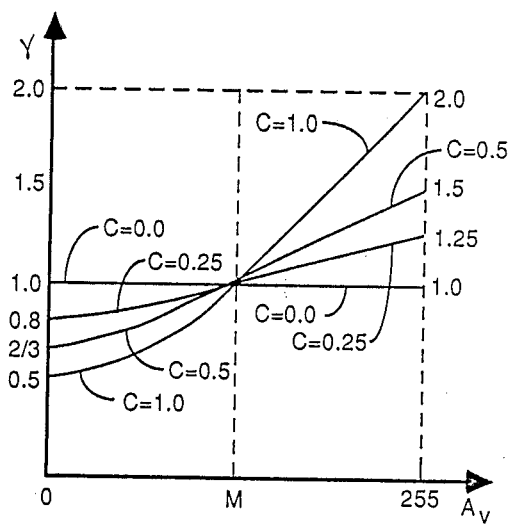
FIG. 3 is a graphical representation showing the variation of gamma $\gamma$ with different selected control parameters.

Referring now to FIG. 3, there is shown a graphical representation of the variation in gamma γ as a function of the variation of the control parameter C. Thus, it can be seen that for a control parameter C value of 1 gamma γ varies from 0.5 to 2. If the control parameter C is selected to be 0, gamma γ remains constant at 1. Although for a typical imaging application which requires dynamic range compression, it may be satisfactory to select the control parameter C to equal 1 thereby achieving an extreme variation in gamma from 2 to 0.5, it may be desirable to increase the amount of localized contrast thereby selecting values of the control parameter C greater than 1.

Figure 4:
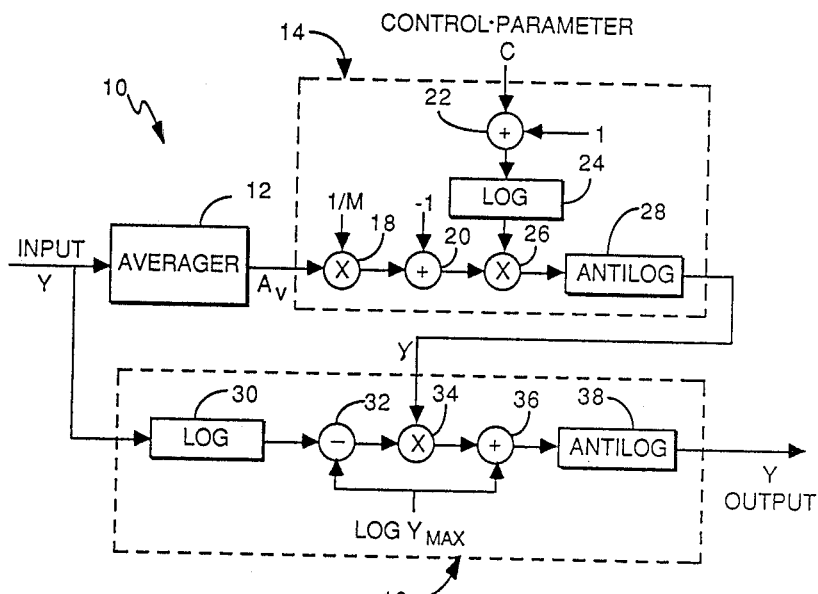
FIG. 4 is a block diagram showing in substantially more detail a system for enhancing electronic image data of this invention in the manner of FIG. 1.

Referring now to FIG. 4 where like numerals reference previously discussed components, there is shown a circuit diagram for implementing a transfer function as described in connection with FIG. 1. The aforementioned transfer function may be converted to the following relationship by taking the logarithm on both sides of the aforementioned equation.

$$\log Y_{out} = \log Y_{MAX} + \gamma(\log Y_{in} - \log Y_{MAX})$$

Similarly, the relationship for determining gamma can also be rewritten as follows:

$$\log \gamma = (Av/M - 1)[\log(1+C)]$$

These relationships can be implemented as shown by the circuit of FIG. 4. The average value of the image defining luminance electronic information signal is first directed to a multiplier circuit 18 where the signal is multiplied by 1/M where M equals one-half the dynamic range of the electronic information signals as previously discussed. The output from the multiplier circuit 18, in turn, is directed to a combining circuit 20 which operates to add a negative 1 to the output from the multiplier circuit 18. The control parameter C is directed to a combiner circuit 22 which operates to add a positive 1 thereto. The output from the combiner circuit 22, in turn, is directed to a log circuit 24 which provides the logarithmic value for the C+1 input thereto. The output from the logarithmic circuit 24, in turn, is multiplied by the output from the combining circuit 20 by a multiplier circuit 26. The output from the multiplier circuit 26, in turn, is directed to an antilogarithmic determining circuit 28 which operates utilizing a lookup table to provide the antilogarithm creating the value of gamma $\gamma$.

The image defining luminance electronic information signal for each pixel, in turn, is directed to a logarithm determining circuit 30 in the transfer function circuit 16. The output from the logarithm determining circuit 30, in turn, is directed to a combiner circuit 32 which operates to subtract therefrom the logarithm for the maximum dynamic range of the electronic information signals. The output from the combiner 32, in turn, is multiplied by multiplier circuit 34 by the value of gamma $\gamma$ received from the antilogarithm determining circuit 28. The output from the multiplier 34, in turn, is directed to a combiner circuit 36 for addition to the logarithm of the maximum dynamic range of the electronic information signals. The output from the combiner circuit 36, in turn, is directed to an antilogarithm determining circuit 38 to provide the transformed image defining luminance electronic information signals $Y_{out}$ as shown. Thus, in this manner, gamma $\gamma$ is determined continuously in accordance with the relationship as shown by the block diagram of FIG. 1 in a simple and convenient manner utilizing multiplication circuits, combining circuits, logarithm determining circuits, and antilogarithm determining circuits as shown in FIG. 4. In like manner, the transfer function continuously varied in accordance with the selection of gamma may also be imposed continuously in a simple and convenient manner by circuitry comprising a logarithm determining circuit, combining circuits, multiplication circuit, and an antilogarithm determining circuit. Thus, in this manner localized dynamic contrast enhancement can be provided as a function of dynamic gamma transformation on a pixel-by-pixel basis.

Thus, the system and method of this invention provides for enhancing electronic image data in a manner involving a relatively small number of computations that can be easily calculated in a continuous manner. All of the transfer functions that can be invoked are of a continuous nature without any sharp discontinuities that could otherwise result in undesirable artifacts appearing in the final image. In addition, as previously mentioned, none of the transfer functions operate to clip any portion of the incoming electronic information signal, thus resulting in the entire dynamic range of the incoming signal being transformed.

Other embodiments of the invention including additions, subtractions, deletions and other modifications of the preferred disclosed embodiments of the invention will be obvious to those skilled in the art and are within the scope of the following claims.

What is claimed is:

1. A system for continuously enhancing electronic image data received in a continuous stream of electronic information signals, each signal having a value within a determinate dynamic range of values and corresponding to one of a plurality of succeeding pixels which collectively define an image, said system comprising:

means for averaging electronic information signals corresponding to selected pluralities of pixels and providing an average electronic information signal for each said plurality of pixels so averaged; and means for selecting one of a plurality of different transfer functions for the electronic information signal for each of the succeeding pixels in a manner whereby each transfer function is selected as a function of the electronic information signal for one pixel and the average electronic information signal for the select plurality of pixels containing said one pixel and for subsequently transforming the electronic information signal corresponding to each pixel by the transfer function selected for that pixel wherein said selecting and transforming means further operates to select said transfer function as a function of the ratio of the value of the average electronic information signal to the dynamic range of the electronic information signals such that the ratio increases in correspondence with the increase in the value of the average electronic information signal.

2. The system of claim 1 wherein said selecting and transforming means is responsive to an average electronic information signal indicative of low scene light intensity levels for transforming the electronic information signals to provide a higher contrast to those electronic information signals corresponding to pixels having the lowest scene light intensity levels and is further responsive to an average electronic information signal indicative of high scene light intensity levels for transforming the electronic information signals to provide a higher contrast to those electronic information signals corresponding to pixels having the highest scene light intensity levels.

3. The system of claim 2 wherein said selecting and transforming means further operates to select said transfer function as a function of a determined constant whose value corresponds to the amount of contrast provided in those areas of higher contrast provided by said select transfer function.

4. The system of claim 3 wherein said selecting and transforming means further operates to determine the select transfer function as a function of the determination of gamma ($\gamma$), said selecting and transforming means including means for determining gamma ($\gamma$) in accordance with the relationship $$\gamma = (1+C)(Av/M - 1)$$

where C equals said determined constant, Av equals the average electronic information signal value and M equals a select proportionate value of the dynamic range of the electronic information signals.

5. The system of claim 4 wherein said transforming means transforms the electronic information signal of each pixel in accordance with the relationship $$Y_{out} = Y_{MAX}(Y_{in}/Y_{MAX})^\gamma$$

where $Y_{in}$ equals the value of the electronic information signal of the pixel to be enhanced, $Y_{out}$ equals the enhanced value of the input electronic information signal and $Y_{MAX}$ equals the highest value of the dynamic range for the electronic information signals.

6. A system for enhancing electronic image data received in a continuous stream of electronic information signals each signal having a value within a determinate dynamic range of values and corresponding to one of a plurality of succeeding pixels which collectively define an image, said system comprising:

means for averaging electronic information signals corresponding to selected pluralities of pixels and providing an average electronic information signal for each said plurality of pixels so averaged;

means for dividing each of the average electronic information signals corresponding to each pixel by a value M corresponding to a select proportionate value of the dynamic range of said electronic information signals;

first means for subtracting 1 from each of the electronic information signals output by said dividing means;

first means for adding a select control parameter and 1;

first means for determining the logarithm of the output from said first adding means;

first means for multiplying the output from said first logarithm determining means by the output from said first subtracting means;

first means for determining the antilogarithm of the output from said first multiplying means;

second means for determining the logarithm for each of the continuous streams of electronic information signals;

second means for subtracting the logarithm for a value corresponding to the maximum value of the electronic information signals from the output of said second logarithm determining means;

second means for multiplying the output of said first antilogarithm determining means by the output from said second subtracting means;

second means for adding the logarithm of the value corresponding to the maximum value of the electronic information signals to the output from said second multiplying means; and second means for determining the antilogarithm of the output from said second adding means to provide an enhanced output signal value.

7. A method for continuously enhancing electronic image data received in a continuous stream of electronic information signals each signal having a value within a determinate dynamic range of values and corresponding to one of a plurality of succeeding pixels which collectively define an image, said method comprising the steps of:

averaging the electronic information signals corresponding to selected pluralities of pixels and providing an average electronic information signal for each said plurality of pixels;

selecting one of a plurality of different transfer functions for the electronic information signal for each of the plurality of succeeding pixels in a manner whereby each transfer function is selected as a function of the electronic information signal for one pixel and the average electronic information signal for the select plurality of pixels containing said one pixel; and transforming the electronic information signal corresponding to each pixel by the transfer function selected for that pixel wherein said transfer function is selected further as a function of the ratio of the value of the average electronic information signal to a select proportionate value of the dynamic range of the electronic information signals such that the ratio increases in correspondence with the increase in the value of the average electronic information signal.

8. The method claim 7 wherein the transfer function is selected: in response to an average electronic information signal indicative of low scene light intensity levels to provide a higher contrast to those electronic information signals corresponding to pixels having the lowest scene light intensity levels and in response to an average electronic information signal indicative of high scene light intensity levels to provide a higher contrast to those electronic information signals corresponding to pixels having the highest scene light intensity levels.

9. The method of claim 8 wherein said transfer function is selected further as a function of a determined constant wherein increasing the value of said constant operates to increase the contrast in those areas of higher contrast provided by said select transfer function.

10. The method of claim 9 wherein said transfer function is selected as a function of the determination of gamma ($\gamma$) and gamma ($\gamma$) is determined for each pixel in accordance with the relationship $$\gamma = (1+C)(Av/M - 1)$$

where C equals said determined constant, Av equals the average electronic information signal value and M equals said value for one-half the dynamic range of the electronic information signals.

11. The method of claim 10 wherein said select transfer function for the electronic information signal of each pixel comprises the relationship $$Y_{out} = Y_{MAX}(Y_{in}/Y_{MAX})^\gamma$$

where $Y_{in}$ equals the value of the electronic information signal of the pixel to be enhanced, $Y_{out}$ equals the enhanced value of the input electronic information signal and $Y_{MAX}$ equals the highest value of the dynamic range for the electronic information signals.

12. A method for enhancing electronic image data received in a continuous stream of electronic information signals each signal corresponding to one of a plurality of succeeding pixels which collectively define an image, said method comprising the steps of:

averaging the electronic information signals corresponding to selected pluralities of pixels and providing an average electronic information signal for each said plurality of pixels;

dividing each of the average electronic information signals corresponding to each pixel by a value M corresponding to a select proportionate value of the dynamic range of said electronic information signals;

subtracting 1 from each of the electronic information signals previously divided by the value M to provide a first intermediate signal value;

selecting a control parameter C as a function of the amount of image enhancement to be applied;

adding 1 to the control parameter C;

determining the logarithm of the control parameter C plus 1;

multiplying the logarithm of the control parameter C plus 1 by said first intermediate signal value to provide a second intermediate signal value;

determining the antilogarithm of the second intermediate signal value;

determining the logarithm for each of the continuous streams of electronic information signals;

subtracting from the previously determined logarithm for each of the continuous streams of electronic information signals the logarithm for a value corresponding to the maximum value of the electronic information signals to provide a third intermediate signal value;

multiplying the antilogarithm of the second intermediate signal value by the third intermediate signal value to provide a fourth intermediate signal value;

adding the logarithm of the value corresponding to the maximum value of the electronic information signals to the fourth intermediate signal value to provide a fifth intermediate signal value; and determining the antilogarithm of the fifth intermediate signal value to provide an enhanced output signal value.

13. The method of claim 12 wherein said image enhancement operates to increase image contrast locally in areas of pixels having low contrast and said control parameter C is determined as a function of the amount of local contrast variation to be provided.

* * * * *